(12) United States Patent
Verhoeven

(10) Patent No.: US 11,167,605 B2
(45) Date of Patent: Nov. 9, 2021

(54) DEVICE FOR COUPLING A TIRE PUMP TO A VALVE OF A TIRE, A SET OF THE DEVICE AND PUMP NIPPLES AND A METHOD FOR INCREASING THE PRESSURE IN A TIRE

(71) Applicant: N VERHOEVEN HOLDING B.V., Culemborg (NL)

(72) Inventor: Norberth Franciscus Verhoeven, West-en Middelbeers (NL)

(73) Assignee: N Verhoeven Holding B.V., Wenum Wiesel (NL)

( * ) Notice: Subject to any disclaimer, the term of this patent is extended or adjusted under 35 U.S.C. 154(b) by 0 days.

(21) Appl. No.: 16/199,888

(22) Filed: Nov. 26, 2018

(65) Prior Publication Data

US 2019/0160897 A1 May 30, 2019

(30) Foreign Application Priority Data

Nov. 27, 2017 (EP) .................................. 17203811

(51) Int. Cl.
| | | |
|---|---|---|
| *B60C 29/06* | (2006.01) | |
| *B60S 5/04* | (2006.01) | |
| *F04B 39/10* | (2006.01) | |
| *F04B 33/00* | (2006.01) | |

(52) U.S. Cl.
CPC ............ *B60C 29/064* (2013.01); *B60C 29/06* (2013.01); *B60S 5/04* (2013.01); *F04B 39/10* (2013.01); *F04B 33/005* (2013.01)

(58) Field of Classification Search
CPC ......... B60C 29/064; B60C 29/06; B60S 5/04; F04B 39/10; F04B 33/005

USPC .............................. 137/231; 141/38; 152/415
See application file for complete search history.

(56) References Cited

U.S. PATENT DOCUMENTS

| | | | |
|---|---|---|---|
| 688,698 A | 12/1901 | Rupp | |
| 2,710,038 A * | 6/1955 | Holzmueller, Sr. ..... | B60C 27/06 152/218 |
| D305,097 S * | 12/1989 | Converse ....................... | D8/394 |
| 6,978,796 B2 * | 12/2005 | Ostrowiecki ....... | F16K 17/0413 137/223 |
| 2011/0265909 A1* | 11/2011 | Stehle ................... | B29C 73/166 141/38 |

FOREIGN PATENT DOCUMENTS

| | | |
|---|---|---|
| BE | 464836 A | 5/1946 |
| DE | 188558 C | 11/1905 |
| FR | 530163 A | 12/1921 |
| FR | 537939 A | 6/1922 |
| WO | 9418452 A3 | 8/1994 |

* cited by examiner

*Primary Examiner* — Timothy P. Kelly
*Assistant Examiner* — Christopher M Afful
(74) *Attorney, Agent, or Firm* — Wilcox & Myers, P.C.; Jeffrey O. Myers

(57) ABSTRACT

The invention relates to a device for coupling a tire pump to a valve of a tire and for providing a fluid flow path from said pump to said valve, comprising a pump nipple for covering said valve. The device comprises an elastic band coupled to a body of said device, said band being embodied for positioning around said tire under elastic force.
A preferred embodiment comprises a set of device and at least two pump nipples for use with the device. The invention also relates to a method of inflating a tire.

17 Claims, 3 Drawing Sheets

Figures 1, 2:
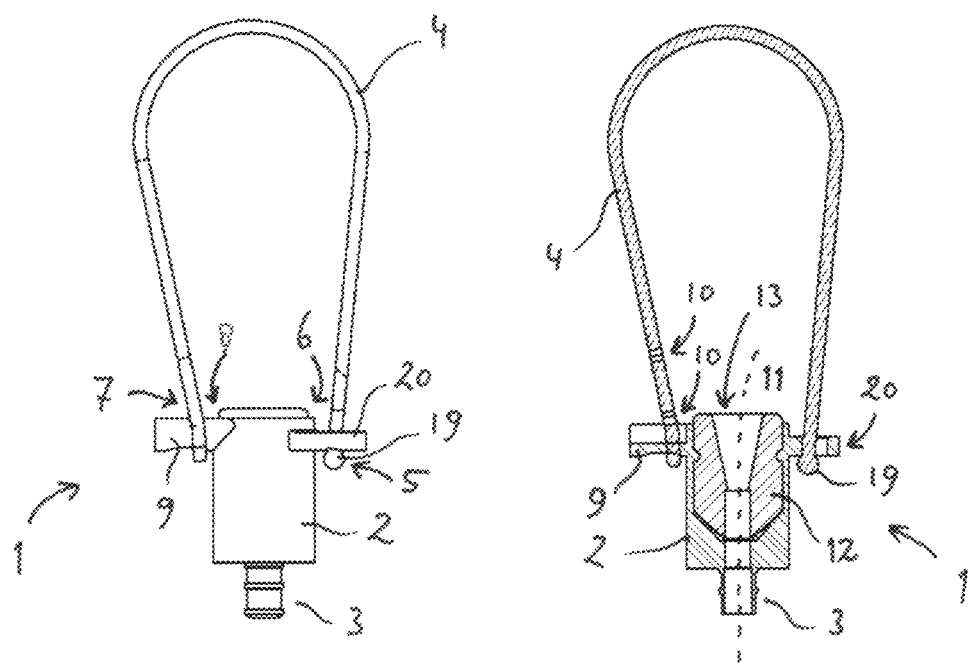

DEVICE FOR COUPLING A TIRE PUMP TO A VALVE OF A TIRE, A SET OF THE DEVICE AND PUMP NIPPLES AND A METHOD FOR INCREASING THE PRESSURE IN A TIRE

The present invention relates to a device for coupling a tire pump to a valve of a tire according to the preamble of claim 1. The invention also relates to a set comprising the device and a plurality a pump nipples according to claim 12 as well as to a method for increasing the pressure in a tire according to claim 13.

It is known in the art to increase the pressure in a tire by coupling a pump nipple to a valve of said tire, the pump nipple being connected to a pump, and operating said pump. Known devices comprise a rubber compression mechanism operated by a lever that seals the pump nipple around the valve, like with Presta-type valves, or that require a strong hand to push the pump nipple airtight against the valve, like with Schrader-type valves. Alternatively, when increasing the pressure in a tire with a so-called Dunlop- or Blitz-type valve, a specially designed clamp is required to keep the pump nipple coupled to the valve.

Such known devices each have the disadvantage that a cumbersome coupling action is required to couple the pump nipple to the valve.

Also, in case of the rubber compression mechanism required for Presta-type valves and the clamp for Dunlop- and Blitz-type valves, the pump or nipple device itself requires complicated equipment to enable a user to efficiently increase the pressure in the tire.

The term "device for increasing the pressure in a tire" relates to the construction part that is placed in between the valve and the pump. It may be a separate constructional part that can be stored independently from the pump but it may also form part of the pump, especially in the case of a bicycle pump that is taken on a bike ride.

The invention aims at providing an improved device for increasing the pressure in a tire of the kind mentioned in the preamble.

The invention further aims at providing a method for increasing the pressure in a tire, the method applying the device according to the present invention.

So as to obtain at least one of the above mentioned aims, the invention provides a device as mentioned in claim 1. This device has the advantage that it can be used for every type of valve without any additional accessory. As a matter of fact, it can also be used with valves that are provided with reducing valves, as is the case with some valves of moped tires. No effort is required to keep the device, more in particular the pump nipple, in airtight connection with the valve.

It has also shown that the device according to the present invention can be manufactured easily and cheaply. Also, the weight of the device according to the present invention is substantially less than the weight of known mechanisms to couple a nipple to a valve. Such synergistic effect is a surprising and advantageous effect.

The invention therefore relates to a device for coupling a tire pump to a valve of a tire and for providing a fluid flow path from said pump to said valve, comprising a pump nipple for covering said valve, the device being characterized in that the device comprises an elastic band coupled to a body of said device, said band being embodied for positioning around said tire under elastic force. Since the elastic band provides the force required to keep the nipple placed on the valve, no manual action by the user is required.

For example, the device may be coupled to a hose of a pump. However, the invention is not limited thereto, since a pump may be connected directly to the valve, as is common in bike pumps. The device therefore may be connected directly to a pump.

According to a preferred embodiment, the pump nipple comprises a recess with an access opening for receiving said valve. Hence, the valve is received within the recess such that the device at least partially surrounds the valve. Such provides a more secure coupling with less risk of the nipple coming off the valve.

In a further preferred embodiment said recess has an inner wall tapering towards a position away from said access opening. Preferably, the diameter of the recess at the access opening thereof has a diameter to be able to receive a largest diameter valve, whereas the smallest diameter of the recess is sufficient large to abut a smallest diameter valve. In such case, the pump nipple can fittingly receive all diameter valves to increase the pressure in a respective tire without air leakage.

A more secure and airtight coupling of the pump nipple to the valve is obtained when an inner wall of said recess is covered with a compressible material. The valve's material will compress said material when the pump nipple is pulled against the valve due to the elastic band's force, such that an airtight seal is obtained.

A simple embodiment is obtained when said pump nipple is embodied as a single piece with said body, i.e. as a unitary body. Only a single manufacturing step is required, without the need to assemble multiple parts, which yields a cheap device.

When the device is envisaged for use with multiple types of valves, the pump nipple may preferably be embodied as an insertable piece in a recess provided in said body. A cyclist riding a bike with racing tires then only needs to take the body with a pump nipple that exactly fits a Presta valve, whereas at home he may use the device using a pump nipple with a larger access opening so as to inflate tires with other valves like a Schrader- or Dunlop-type valve. In such cases, a pump nipple may be used that exactly fits a single valve-type only as is preferred by some people, for example because of a reduced size of such exactly fitting pump nipple.

When using a device with a replaceable pump nipple, it is preferred that at least one of abutting walls of said body and said insertable piece is provided with a compressible material. Not a complete abutting surface needs to be provided with a compressible material, part of such surface can be provided therewith, ensuring that an airtight seal is obtained.

As mentioned above, the device is embodied for providing a fluid connection between the pump and the valve of the tire, more in particular between the pump and the tire so as to be able to inflate said tire by means of said pump. The device thereto for example comprises a connector for coupling a tire pump to said device, the connector being in fluid connection with the pump nipple. The connector may be embodied for coupling a hose thereto of for directly coupling same to the housing of a pump.

A very convenient coupling of the device is obtained when the elastic band is coupled to opposite sides of the device. When the elastic band is guided along the tire, one end of the elastic band may be positioned at a left side of the tire whereas the other end of the elastic band may be positioned at a right side of the tire. The device thus is coupled stably to the elastic band when coupling positions for the band are positioned at opposite sides of the device.

So as to be able to easily remove the device from the valve, the elastic band is preferably removably coupled at at least one position of said device.

The device according to the present invention can be used for inflating many different sizes of tires. Since different sizes of tires usually have different heights, it is preferred that the elastic band is provided with at least two coupling positions for removably coupling same at at least a first or a second position to the device.

According to a further embodiment, the present invention relates to a set comprising a device according to the invention wherein the pump nipple is embodied as an insertable optionally in combination with any of claims 2-5, comprising said device and at least two pump nipples, wherein a diameter of an access opening of a first pump nipple is larger than the diameter of the access opening of another pump nipple, preferably at least three pump nipples each pump nipple having a differently sized diameter of access opening.

According to a still further embodiment, the invention relates to a method for increasing the pressure in a tire, comprising the steps of positioning a device according to the present invention on a valve of said tire, placing the elastic band around the tire and coupling same to the device, for example at opposite sides of the device, and operating said pump. By this method, an easy way of inflating a tire is obtained.

In the method, it is preferred to perform the step of applying a pump nipple with an access opening that fits the tire's valve. This ensures an airtight seal of the pump nipple on the valve, allowing one to easily and fast inflating the tie.

As mentioned before with reference to the device according to the invention, it is preferred that the elastic band is removably coupled at at least one position of said device, for example at least one side of said device.

Figure 3:
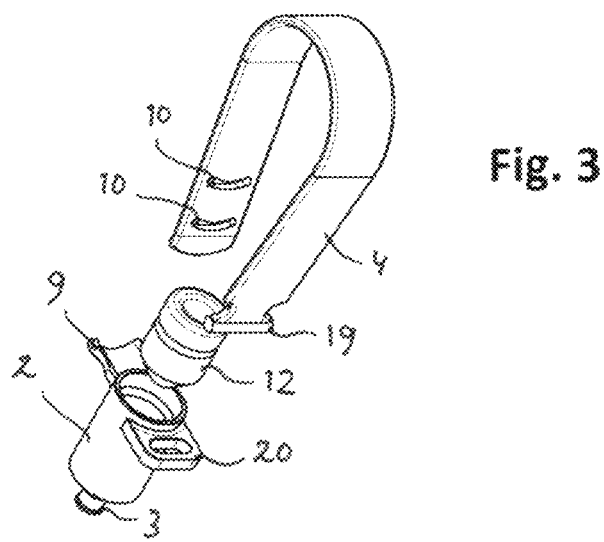
Figures 4, 5:
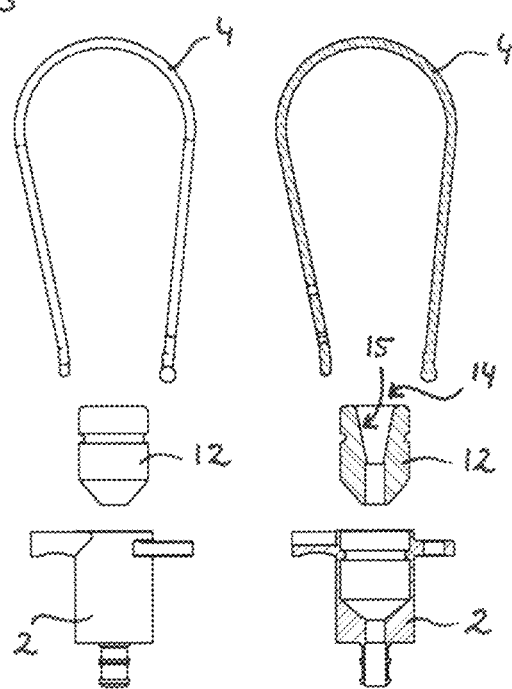
Figure 6:
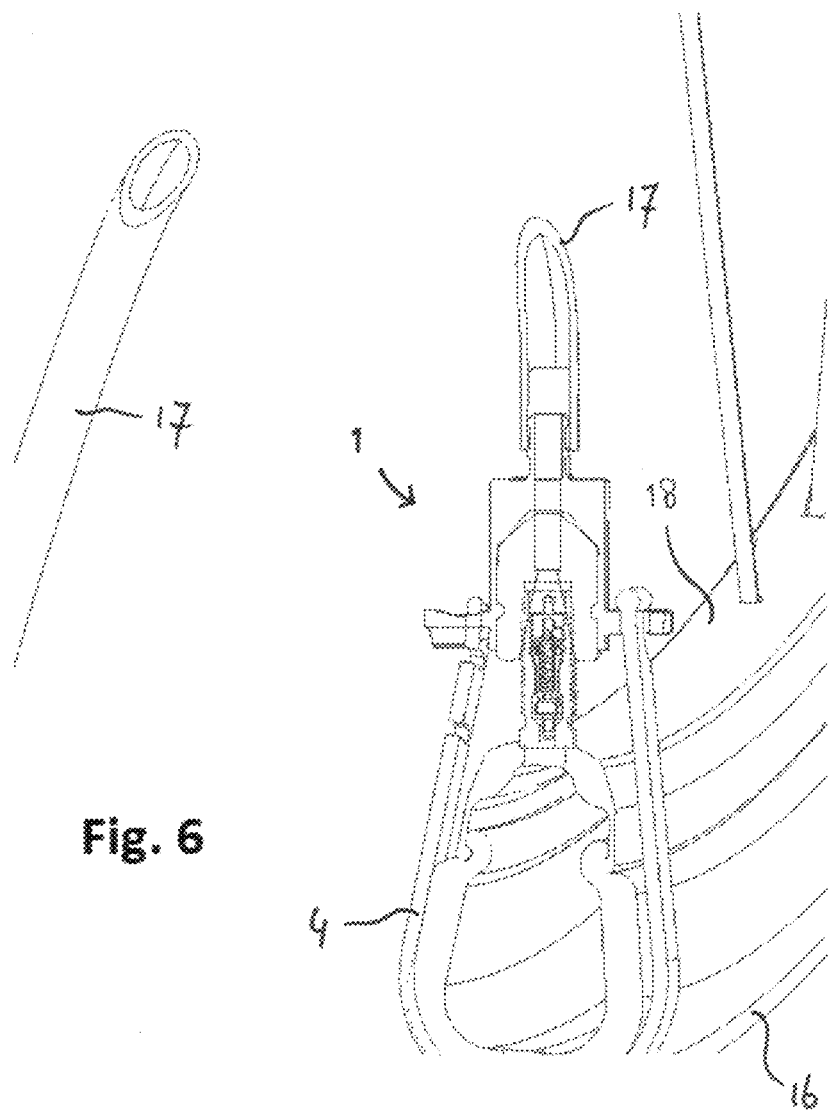

Hereafter, the invention will be further described by means of a drawing. The drawing shows in:

FIG. 1 a side view of the device according to the invention,

FIG. 2 a sectional view of the device according to the invention,

FIG. 3 a perspective explosion view of the device according to the invention, FIG. 4 an explosion view from the side of the device according to the invention, FIG. 5 a sectional explosion view of the device according to the invention, and FIG. 6 a perspective view of the device according to the invention, a tire and a pump.

The same and similar parts and features have been denoted by the same reference numerals in the figures. However, for ease of understanding the figures, not all parts that are required for a practical embodiment have been shown in the figures.

FIG. 1 shows a side view of the device 1 according to the invention. The device 1 comprises a body 2 with a connector 3 for a hose of a pump (not shown in this figure). The hose may be clampingly fitted as such or a hose clamp may be applied. An elastic band 4 is coupled to the body 2. A first end 5 of the band 4 is coupled to a first side 6 of the body 2 whereas the band 4 is coupled to the body 2 at a remote position 7 to an opposite side 8 of the body 2. Hence, the elastic band 4 forms a loop.

Coupling of the band 4 to the body 2 is easily obtained by means of notches 9, for example at the body 2, for mutual cooperation with openings 10, for example in the elastic band 4. As shown also in FIG. 1 and FIG. 2, the band 4 may comprise a notch 19 for positioning behind a shoulder 20 of a coupling member at the body 2.

FIG. 2 shows a sectional view of the device shown in FIG. 1. The parts as referred to in the description of FIG. 1 can be easily recognized. In addition, FIG. 2 shows the fluid flow path 11 (indicated by a dashed line) gas will flow when operating the pump referred to above for inflating a tire (not shown). The flow path extends from the connector 3 to an opening 13 in the body 2 for receiving a valve of a tire.

The band 4 comprises a plurality of openings 10 so as to be able to increase or decrease the length of the loop.

FIG. 2 shows an insertable piece 12 in the body 2. This insertable (and removable) piece 12 comprises a pump nipple 12 for receiving a valve (not shown) of the tire to be inflated. The tire's valve is to be received in the recess 13 through access opening 14, as shown in FIG. 5. Since the inside wall 15 (also as shown in FIG. 5) of pump nipple 12 is tapering towards the inside, the depth to which the valve is inserted depends on the diameter of said valve and said inside wall 15. Valves of many different sizes can be used with the present pump nipple 12 due to the tapering wall 15.

In FIG. 3 an explosion view of the device 1 has been shown. The body 2 and the insertable pump nipple piece 12 as well as the elastic band 15 are clearly distinguishable in this drawing.

FIG. 4 and FIG. 5 show an explosion view of FIG. 1 and FIG. 2, respectively.

Finally, FIG. 6 shows a perspective view of the device 1 in operation. A valve of a bicycle tire 16 is inserted in the recess 13 of the pump nipple 12. A hose 17 of a pump (not shown) is connected to the connector 3 of the device 1, such that when operating the pump air will be moved through the fluid flow path 11, inflating the tire 16. The elastic band 4 is guided over the tire 16 and rim 18 and is coupled to the device 1.

The invention is not limited to the embodiments as mentioned above and as shown in the drawings. The invention is limited by the claims only.

The invention also relates to all combinations of features described here independently of each other.

The invention claimed is:

1. A device for coupling a tire pump to a valve of a tire and for providing a fluid flow path from said pump to said valve, wherein the device comprises a body, a pump nipple for covering said valve and an elastic band directly coupled to said body, said elastic band being embodied for positioning around said tire under elastic force, and said elastic band comprising two or more openings corresponding to a notch in said body, wherein said elastic band then exerts an axial pressure to obtain an airtight closure of the pump nipple on the valve and to maintain the airtight closure during inflation of the tire without further adjustment.

2. The device according to claim 1, wherein said pump nipple comprises a recess with an access opening for receiving said valve.

3. The device according to claim 2, wherein said recess has an inner wall tapering towards a position away from said access opening.

4. The device according to claim 2, wherein an inner wall of said recess is covered with a compressible material.

5. The device according to claim 1, wherein said pump nipple is embodied as a single piece with said body.

6. The device according to claim 1, wherein said pump nipple is embodied as an insertable piece in a recess provided in said body.

7. The device according to claim 6, wherein at least one of the abutting walls of said body and said insertable piece is provided with a compressible material.

8. The device according to claim 1, wherein the device comprises a connector for coupling a tire pump to said device, the connector being in fluid connection with the pump nipple.

9. The device according to claim 1, wherein said elastic band is coupled at opposite sides of said device.

10. The device according to claim 1, wherein the elastic band is removably coupled at at least one position of said device via said two or more openings in said elastic band.

11. The device according to claim 10, wherein the elastic band is provided with at least two coupling positions for removably coupling same at at least a first or a second position to the device.

12. A kit comprising a device according to claim 1, comprising said device and at least two pump nipples, wherein a diameter of an access opening of a first pump nipple is larger than a diameter of an access opening of another pump nipple, each pump nipple having a differently sized diameter of access opening.

13. The kit according to claim 12 comprising at least three pump nipples.

14. A method for increasing pressure in a tire, comprising the steps of positioning a device according to claim 1 on a valve of said tire, placing the elastic band around the tire and coupling same to the device and operating said pump.

15. The method according to claim 14 additionally comprising coupling the elastic band at opposite sides of the device.

16. The method according to claim 14, wherein the pump nipple is embodied as an insertable piece in a recess provided in the body, additionally comprising the step of applying the pump nipple with an access opening that fits the tire's valve.

17. The method according to claim 14, wherein the elastic band is removably coupled at at least one position of the device.

* * * * *